United States Patent
Herron

(10) Patent No.: US 9,832,930 B2
(45) Date of Patent: Dec. 5, 2017

(54) COMBO CROP HARVESTER CROP TRANSFER MEANS

(71) Applicant: AGCO Corporation, Hesston, KS (US)

(72) Inventor: Maynard M. Herron, Hesston, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 14/912,814

(22) PCT Filed: Sep. 10, 2014

(86) PCT No.: PCT/US2014/054921
§ 371 (c)(1),
(2) Date: Feb. 18, 2016

(87) PCT Pub. No.: WO2015/038592
PCT Pub. Date: Mar. 19, 2015

(65) Prior Publication Data
US 2017/0258008 A1 Sep. 14, 2017

Related U.S. Application Data

(60) Provisional application No. 61/875,803, filed on Sep. 10, 2013.

(51) Int. Cl.
*A01D 61/00* (2006.01)
*A01D 41/12* (2006.01)
(Continued)

(52) U.S. Cl.
CPC ....... *A01D 61/008* (2013.01); *A01D 41/1243* (2013.01); *A01D 90/10* (2013.01);
(Continued)

(58) Field of Classification Search
CPC .. A01D 61/008; A01D 41/1243; A01D 90/10; A01F 15/04; A01F 15/10; B65B 35/10; B65B 65/02; B65G 31/04
(Continued)

(56) References Cited

U.S. PATENT DOCUMENTS 2,318,881 A * 5/1943 Mundy .................. B65G 69/00
198/525
2,964,204 A * 12/1960 Wilson ...................... E01H 1/00
15/83

(Continued)

FOREIGN PATENT DOCUMENTS

| WO | 03/051101 A1 | 6/2003 |
| WO | 2011/012953 A1 | 2/2011 |
| WO | 2013/090874 A1 | 6/2013 |

OTHER PUBLICATIONS

European Patent Office, International Search Report for International Application No. PCT/US2014/054921, dated Dec. 23, 2014.

*Primary Examiner* — Mark A Deuble

(57) ABSTRACT

A system conveying material-other-than-grain (MOG) from a harvesting machine to a packaging machine towed by the harvesting machine. The system includes an joint pivotably joining a harvesting machine hitch to a packaging machine hitch. An accelerator is mounted to the packaging machine hitch. The accelerator has a housing with a top-side inlet and a side outlet. A MOG-propelling disk is disposed in the housing and is rotatable about an axis. A conduit is disposed above the packaging machine hitch and has an inlet end and an outlet end, the inlet end coupled to the side outlet. The conduit has first and second opposing side portions and a top side portion without an opposing bottom portion, with at least part of the top side portion is parallel with the plane of (Continued)

the disk. The accelerator, conduit, and packaging machine are collectively in pivotal arrangement relative to the harvesting machine.

11 Claims, 12 Drawing Sheets

(51) Int. Cl.
  *B65G 31/04*  (2006.01)
  *A01F 15/04*  (2006.01)
  *B65B 35/10*  (2006.01)
  *B65B 65/02*  (2006.01)
  *A01F 15/10*  (2006.01)
  *A01D 90/10*  (2006.01)

(52) U.S. Cl.
  CPC .............. *A01F 15/04* (2013.01); *A01F 15/10* (2013.01); *B65B 35/10* (2013.01); *B65B 65/02* (2013.01); *B65G 31/04* (2013.01)

(58) Field of Classification Search
  USPC .................................................. 198/640, 642
  See application file for complete search history.

(56) References Cited

U.S. PATENT DOCUMENTS

| 4,605,118 A * | 8/1986 | Kotler ................... B65G 65/20 198/509 |
| 2010/0202864 A1* | 8/2010 | Geraets ................. A01D 87/10 414/526 |

* cited by examiner

COMBO CROP HARVESTER CROP TRANSFER MEANS

CROSS REFERENCE TO RELATED APPLICATION

This application claims the benefit of U.S. Provisional Application No. 61/875,803, entitled COMBO CROP HARVESTER CROP TRANSFER MEANS, filed Sep. 10, 2013, which is hereby incorporated by reference in its entirety.

BACKGROUND OF THE INVENTION

Field of Invention

The present disclosure is generally related to crop harvesting and packaging, and, more particularly, is related to conveying material other than grain (MOG) from a harvesting machine to a packaging machine.

Description of Related Art

Combine harvesters harvest crop (e.g., wheat, corn, etc.) and then unload the harvested crop, such as grain, from storage bins residing on the combine harvester to the bed of a receiving vehicle, such as a truck bed. Material other than grain (MOG), such as stalks and other crop residue, may be may be discharged from a threshing rotor and shoe assembly of the combine harvester and conveyed to a packaging machine, such as a towed baler. The baler bundles the MOG and deposits the resulting bundled MOG or bales onto the ground.

Various machanisms have been employed to convey the MOG from the combine harvester to the baler, including using pressurized air to blow the MOG over a duct and into an accumulating container, after which the MOG is conveyed to the baler. In some applications, the combine harvester may discharge the MOG onto a moving conveyor coupled between the combine harvester and the baler. The conveyor, which may include one or more bands, slats, etc. that rotate around opposing members of the conveyor, convey the MOG received form the combine harvester to an inlet opening of the baler. These and/or other mechanisms, such as conveying the MOG over free space, have some shortcomings, such as loss in velocity and hence loss of crop material, that may reduce the efficiency of the MOG gathering/packaging process.

OVERVIEW OF THE INVENTION

In one embodiment, the invention is directed to a system conveying material-other-than-grain (MOG) from a harvesting machine to a packaging machine towed by the harvesting machine. The system includes a joint pivotably joining a harvesting machine hitch to a packaging machine hitch. An accelerator is mounted to the packaging machine hitch. The accelerator has a housing with a top-side inlet and a side outlet. A MOG propelling disk is disposed in the housing and is rotatable about an axis. A conduit is disposed above the packaging machine hitch and has an inlet end and an outlet end, the inlet end coupled to the side outlet. The conduit has first and second opposing side portions and a top side portion without an opposing bottom portion, with at least part of the top side portion is parallel with the plane of the disk. The accelerator, conduit, and packaging machine are collectively in pivotal arrangement relative to the harvesting machine.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

Figure 1:
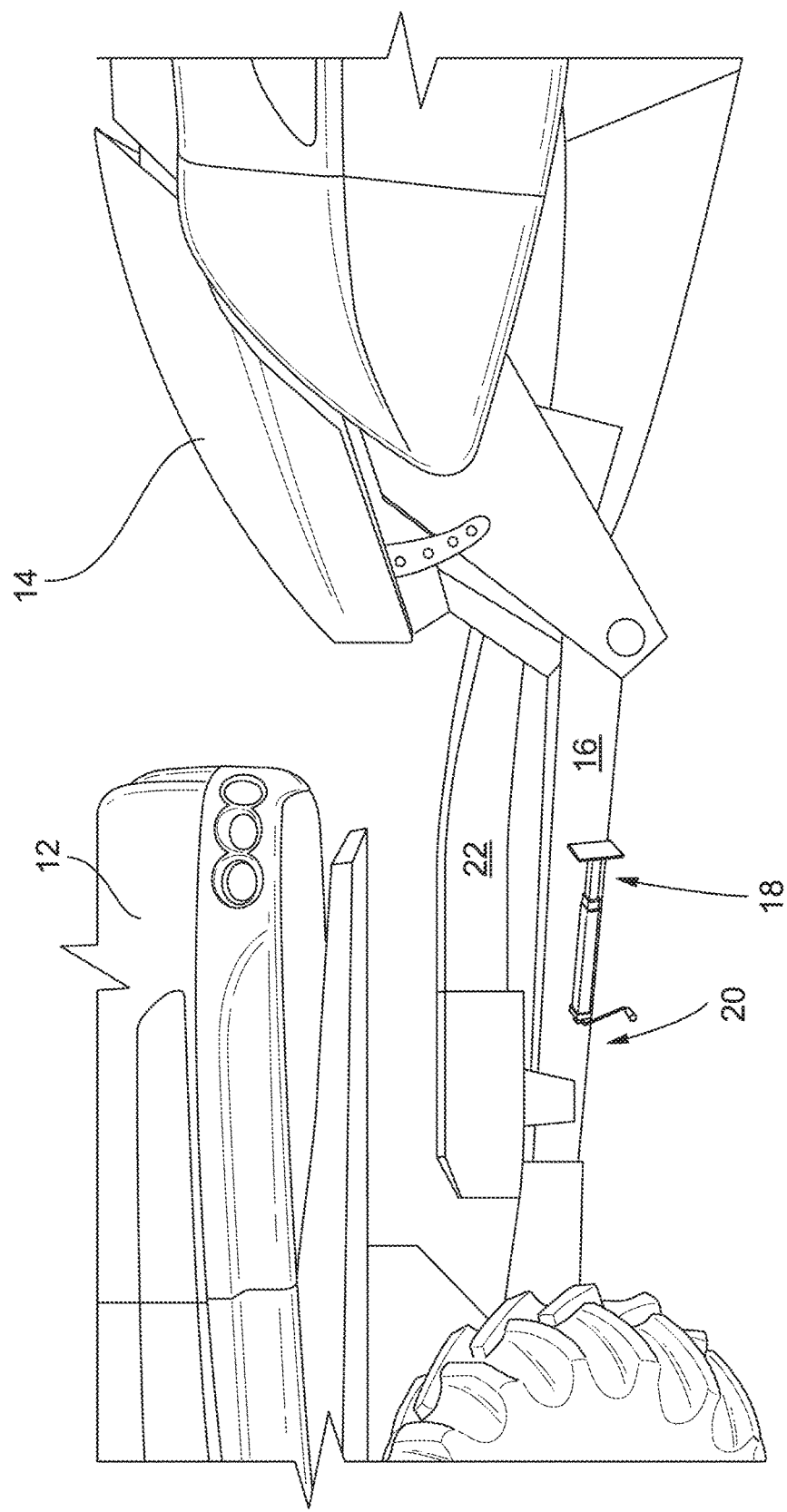
FIG. 1 is a schematic diagram showing, in partial side-elevation view, an embodiment of a material other than grain (MOG) transfer system.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Certain embodiments of a material other than grain (MOG) transfer system and method are disclosed that provide directional control of MOG transferred from a harvesting machine (e.g., a combine harvester) to a towed packaging machine (e.g., a baler) to achieve a consistent point of delivery to an inlet opening (e.g., receiving end) of the packaging machine regardless of the working orientation (e.g., angle of articulation, including turn angle, pitch, yaw, and roll) between the harvesting machine and packaging machine. In one embodiment, the MOG transfer system comprises an accelerator and a substantially bowed (e.g., when viewed in side elevation) conduit. The accelerator comprises, in one embodiment, a substantially circular housing with a motor-driven, rotatable disk disposed therein, the disk comprising a plurality of substantially upright blades that are used to physically propel (e.g., accelerate) the MOG that comes in contact with the blades as the disk rotates. The stream of MOG is propelled in a condensed or consolidated form (e.g., thin, confined layer), and discharged (e.g., tangentially) along a plane coincident with a top surface of the disk that is substantially parallel to at least a portion of a coupled conduit (e.g., discharged through a side outlet of the accelerator in parallel with the top surface of the conduit up to approximately an apex of the bowed conduit). An upper, interior surface of the bowed, top side of the conduit guides the MOG stream trajectory and direction. The condensed, thin layer of the MOG stream is maintained throughout most of the transfer to the packaging machine by virtue of the gradual, directional change that follows from the substantially bowed (arc) shape of the conduit. Maintaining the condensed, thin layer of the MOG stream prevents or mitigates a loss of velocity and/or spread of the MOG stream (assuring minimal MOG loss), as well as prevents or mitigates a ricocheting affect as the MOG travels. The confinement (e.g., consolidation) of the MOG stream also enables passage of the MOG through a restricted space aperture (inlet opening) of the towed packaging machine, while preventing or mitigating any tendency to plug the inlet opening when, for instance, errant material breaches the inlet opening (which, as observed in conventional systems, typically requires an operational stop and manual clearing of the blockage from the packaging machine). Further, the conduit comprises a structure that enables fail-safe operation in case of a plugging of the inlet opening or loss of velocity in the conduit. In particular, the conduit is configured without a bottom side (e.g., without a bottom side that extends to each of the side walls, recognizing that lips or slight extensions may be contiguous with the side walls of the conduit in some embodiments but not sufficient to constitute a bottom side in the ordinary sense). In one embodiment, the conduit comprises an inverted, U-shaped configuration, with the understanding that variations to that structure may be used (e.g., angled sides, discontiguous sides, etc.) and hence are contemplated to be within the scope of the disclosure. In addition, the structural cooperation between the components of the MOG transfer system, as explained below, enables minimal reduction in articulation angles (e.g., often occurring due to contact between the harvesting machine and the packaging machines), enabling excellent maneuverability.

Digressing briefly, conventional systems for transferring MOG from a harvesting machine to a packaging machine may involve methods that transfer a MOG stream through an open-air region, with little or insufficient ability to concentrate the MOG stream. In some conventional systems, a method is used where the MOG is deposited onto a conveyor belt (or slats, etc.), mechanically conveying the MOG to the packaging machine. However, such conveying systems tend to be subject to plugging of the driving mechanisms for the belt, and because of the width of the conveyor, impose maneuverability constraints of a combination machine plus towed machine that may detrimentally impact field efficiency. These and/or other shortcomings of conventional systems as described in the background section may be addressed by one or more embodiments of a MOG transfer system, as is evident from the description below.

Having summarized certain features of a MOG transfer system of the present disclosure, reference will now be made in detail to the description of the disclosure as illustrated in the drawings. While the disclosure is described in connection with these drawings, there is no intent to limit it to the embodiment or embodiments disclosed herein. For instance, one focus of the disclosure will be on a single, axial rotor type combine harvester that tows a square baler, though it should be understood within the context of the present disclosure that other types of combine harvesters (e.g., dual rotor, transverse, hybrid, etc.) and other types of balers (e.g., round balers) may be used, and hence are contemplated to be within the scope of the disclosure. In addition, though emphasis is placed on a combine harvester towing a square baler, it should be understood within the context of the present disclosure that other types of combinations of machines for harvesting, processing, and packaging (e.g., bundling) crop material from the ground may be used, and hence are contemplated to be within the scope of the disclosure. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Referring now to FIG. 1, shown in partial side-elevation view is an embodiment of a material other than grain (MOG) transfer system 10. One having ordinary skill in the art should appreciate in the context of the present disclosure that the MOG transfer system 10 depicted in FIG. 1 comprises components that may be substituted with other components with similar functionality, with the understanding that those components depicted in FIG. 1 are merely illustrative, and that other configurations and arrangement of components may be used in some embodiments. The MOG transfer system 10 comprises a harvesting machine embodied as a combine harvester 12, a packaging machine embodied as a square baler 14, a baler hitch 16 that mechanically couples the combine harvester 12 with the baler 14, and a transfer assembly 18 disposed above the baler hitch 16 and extending between the rear of the combine harvester 12 and an inlet opening of the baler 14. The transfer assembly 18 comprises an accelerator 20 mounted to the baler hitch 16. The accelerator 20 is disposed beneath the rear end of the combine harvester 12. For instance, the accelerator 20 comprises a top-side inlet that is proximal to, and at a lower elevation than, an outlet of the shoe and a MOG discharge end of the thresher rotor (not shown) of the combine harvester 12. Such an arrangement and location for the accelerator 20 enables MOG from the shoe and from the discharge end of the thresher rotor to be discharged into the top-side inlet of the accelerator 20 (e.g., from above and optionally offset from the accelerator 20). The transfer assembly 18 further comprises a conduit 22 that is secured (e.g., attached) at one end to the accelerator 20 and secured (e.g., attached) at the other end to a frame of the baler 14. As depicted in FIG. 1, the conduit has a top side, curvilinear (e.g., substantially bow-shaped), side elevation profile, enabling a gradual, continuous directional change in a trajectory of the MOG discharged from the accelerator 20. As explained above, the MOG stream discharged from the accelerator 20 is controlled to a condensed or concentrated stream by gradually changing direction along a flow path between the accelerator 20 and the inlet opening of the baler 14, minimizing velocity loss of the MOG stream. In a sense, the accelerator 20 and an upper, interior surface of the top side of the conduit 22 may be viewed as control surfaces, wherein an embodiment of a MOG transfer method transitions the MOG between the control surface disposed beneath the MOG (e.g., the accelerator 20, which is located at a lower elevation relative to the MOG discharge points of the combine harvester 12 (as well as beneath the MOG when it falls onto a disk of the accelerator 20)) to a control surface (e.g. the upper, interior surface of the top side of the conduit 22) located above the MOG without significantly altering the velocity or trajectory of the MOG as it is transferred from the combine harvester 12 to the baler 14. Also noted from FIG. 1 is that the conduit 22 is disposed, in one embodiment, directly above the hitch 16 and substantially adjacent to the baler hitch 16, with a maximum gap between the baler hitch 16 and the conduit 22 located approximately at the apex of the conduit 22, as better revealed in FIG. 2.

Figure 2:
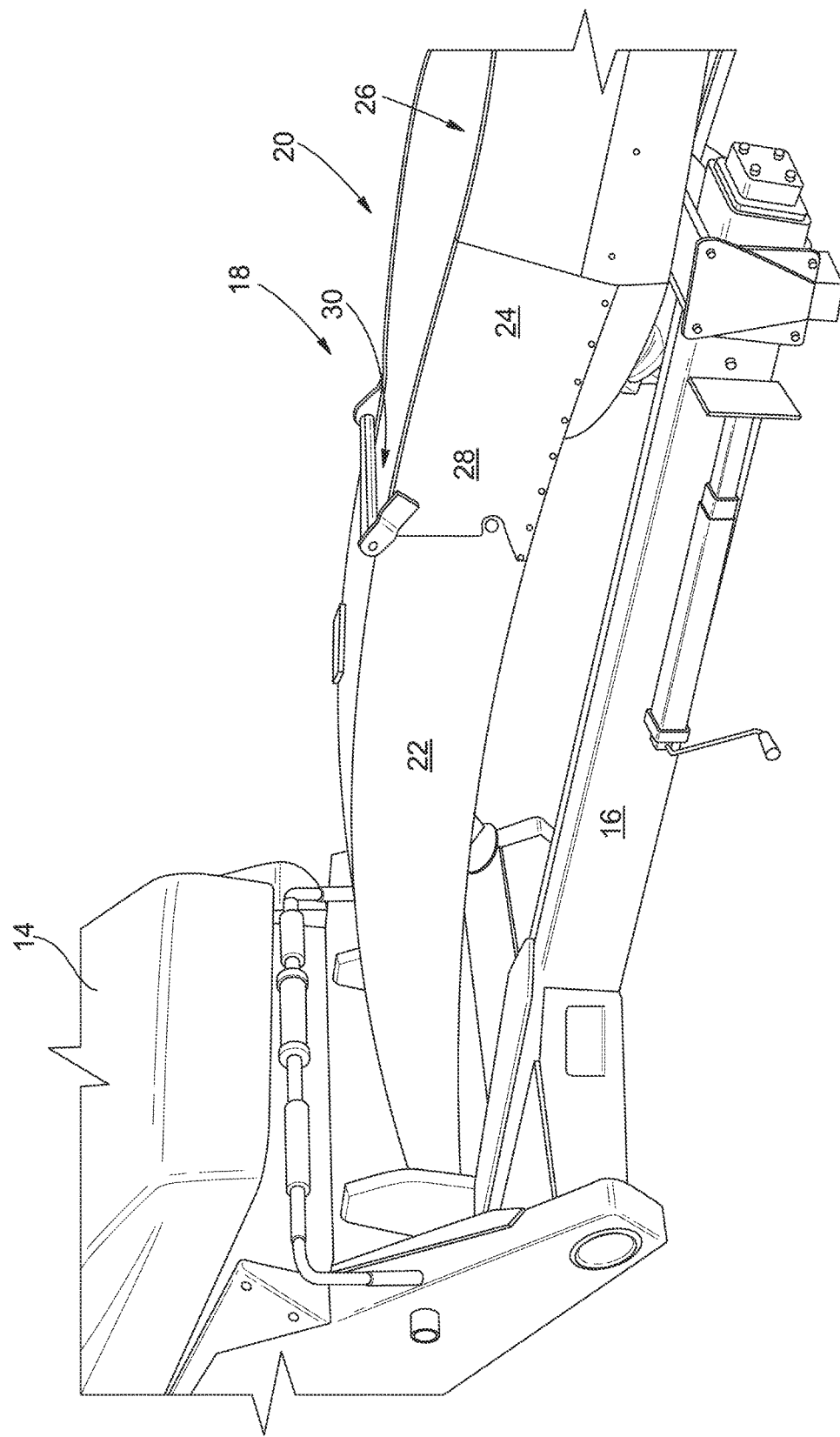
FIG. 2 is a schematic diagram showing, in front perspective view, an embodiment of a MOG transfer system.

FIG. 2 provides another illustration of the transfer assembly 18, shown in a closer, front perspective view. In particular, the transfer assembly 18 is depicted in FIG. 2 with a substantially bowed-shaped conduit 22 disposed above the baler hitch 16 and coupled (e.g., secured) to the baler 14. Also, FIG. 2 depicts the accelerator 20 as including a housing 24. The housing 24 comprises a top-side inlet 26 and a side outlet 28. Although the top-side inlet 26 is depicted as entirely open at the top (e.g., no extended surfaces from the edges of the top-side inlet 26), in some embodiments, the top-side inlet 26 may comprise a lip extending from the top edge of the top-side inlet 26 and inward. For instance, the lip may be orthogonal to the top edge of the top-side inlet 26 (extending inward toward the center axis of the accelerator 20), or in some embodiments, more conical in shape, extending inward and downward from the edge of the top-side inlet 26, such as to facilitate entry of MOG yet inhibit egress from the housing 24. The lip, when employed, may be disposed along the entire top edge of the top-side inlet 26, or a portion thereof. The side outlet 28 interrupts the continuity in circular surface (when viewed from above) of the housing 24 at a location adjacent to an inlet end 30 of the conduit 22. The conduit 22 is secured (e.g., via brackets, bolts, among other known securing mechanisms) at the inlet end 30 to the housing 24, adjacent to the side outlet 28, such that the inlet end 30 directly couples to the side outlet 28. In one embodiment, the discharge of MOG from the side outlet 28 to the inlet end 30 of the conduit 22 and beyond is achieved in parallel or near parallel fashion, minimizing disruption in the flow path and avoiding or mitigating any loss of velocity and/or ricochet effects that may cause material loss.

Figure 3:
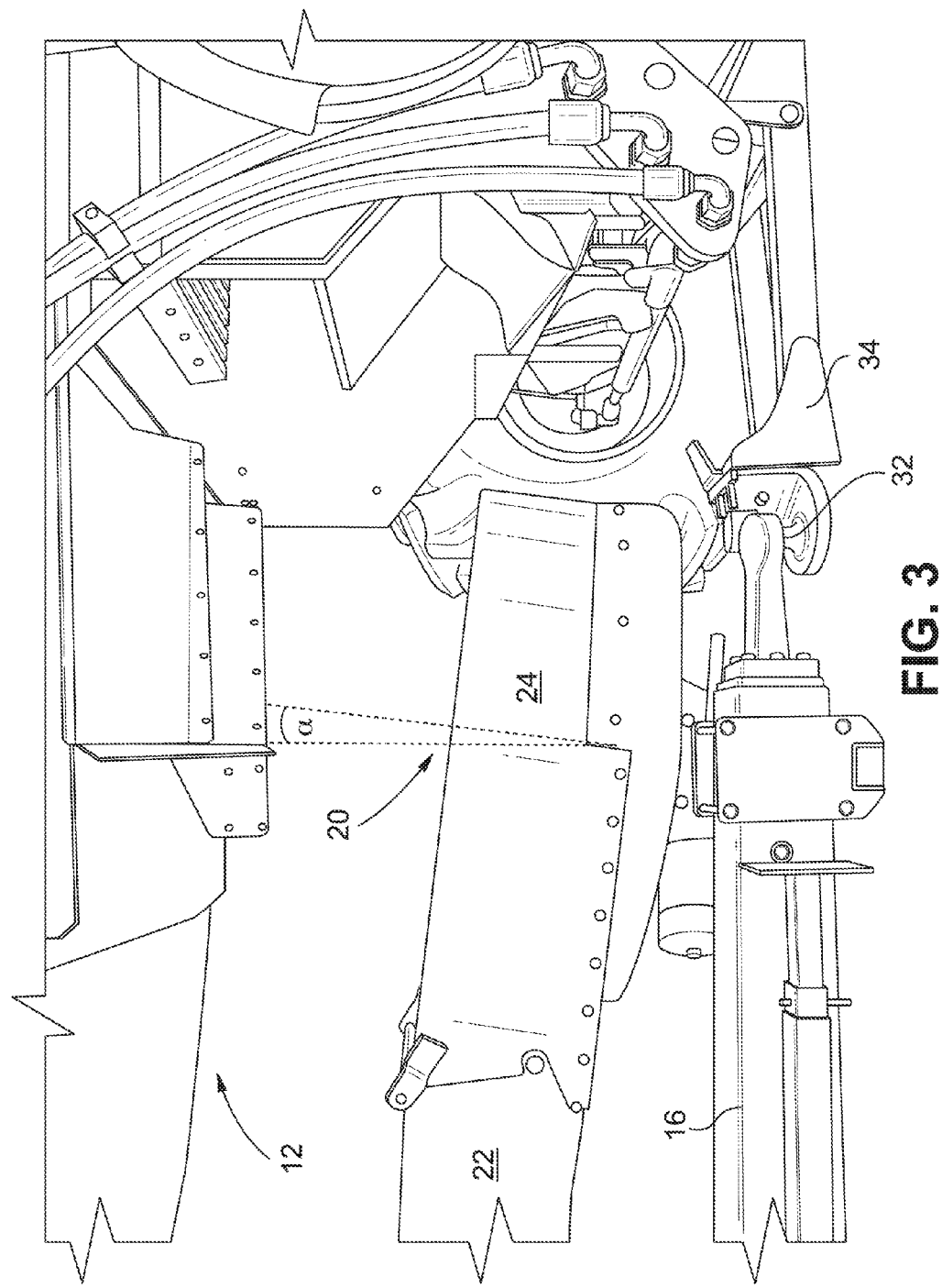
FIG. 3 is a schematic diagram showing, in side elevation view, an embodiment of an accelerator of an example MOG transfer system.

Referring now to FIG. 3, shown in side-elevation view is the accelerator 20, among other components. The accelerator 20, as explained previously, comprises a housing 24 that is mounted (at the bottom surface of the housing 24) to the baler hitch 16 using known securing mechanisms, such as brackets, bolts, or welds, among other securing mechanisms. In some embodiments, the housing may be secured to other locations of the housing 24. The housing 24 is mounted proximal to an omnidirectional articulating joint, which in this example is embodied as a spherical ball joint 32. It should be appreciated that other types of joints that permit multiple degrees of freedom may be used, such as pin and ring, clevis, etc. The ball joint 32 enables coupling of the baler hitch 16 to a harvesting machine hitch 34 of the combine harvester 12. Given that the accelerator 20 is mounted to the baler hitch 16 in close proximity to the ball joint 32, which enables a constant or substantially constant relationship of the accelerator 20 relative to the discharge of the combine harvester rotor, and given the multiple degrees of freedom of the ball joint 32, the transfer assembly 18, because it is attached to the baler hitch 16 of the baler 14, maintains the desired delivery point/trajectory of the MOG relative to the inlet opening of the baler 14 (FIG. 2) regardless of the orientation between the baler 14 and the combine harvester 12. For instance, the ball joint 32 enables changes in turn angle, pitch, yaw, and/or roll, providing a wide range of changes in articulation between the combine harvester 12 and the baler 14 without affecting (e.g., to significantly) the delivery point/trajectory of the MOG through the conduit 22 and to the baler 14. In addition, it is noted that the housing 24 of the accelerator 20 is oriented at an angle, $\alpha$, relative to the vertical axis. In one embodiment, $\alpha$ is determined based on the determined trajectory path of the MOG such that the axis of the housing 24 relative to the vertical axis is perpendicular or substantially perpendicular to a plane of an entrance end of the conduit 22. Stated otherwise, the pitched configuration of the accelerator 20 enables a trajectory of the MOG to follow a curved path through the conduit 22 and enables the MOG to be propelled along a plane that is parallel to the top side of the conduit 22. In some embodiments, the angle, $\alpha$, is adjustable, and in some embodiments, the angle, $\alpha$, is fixed.

Figure 4:
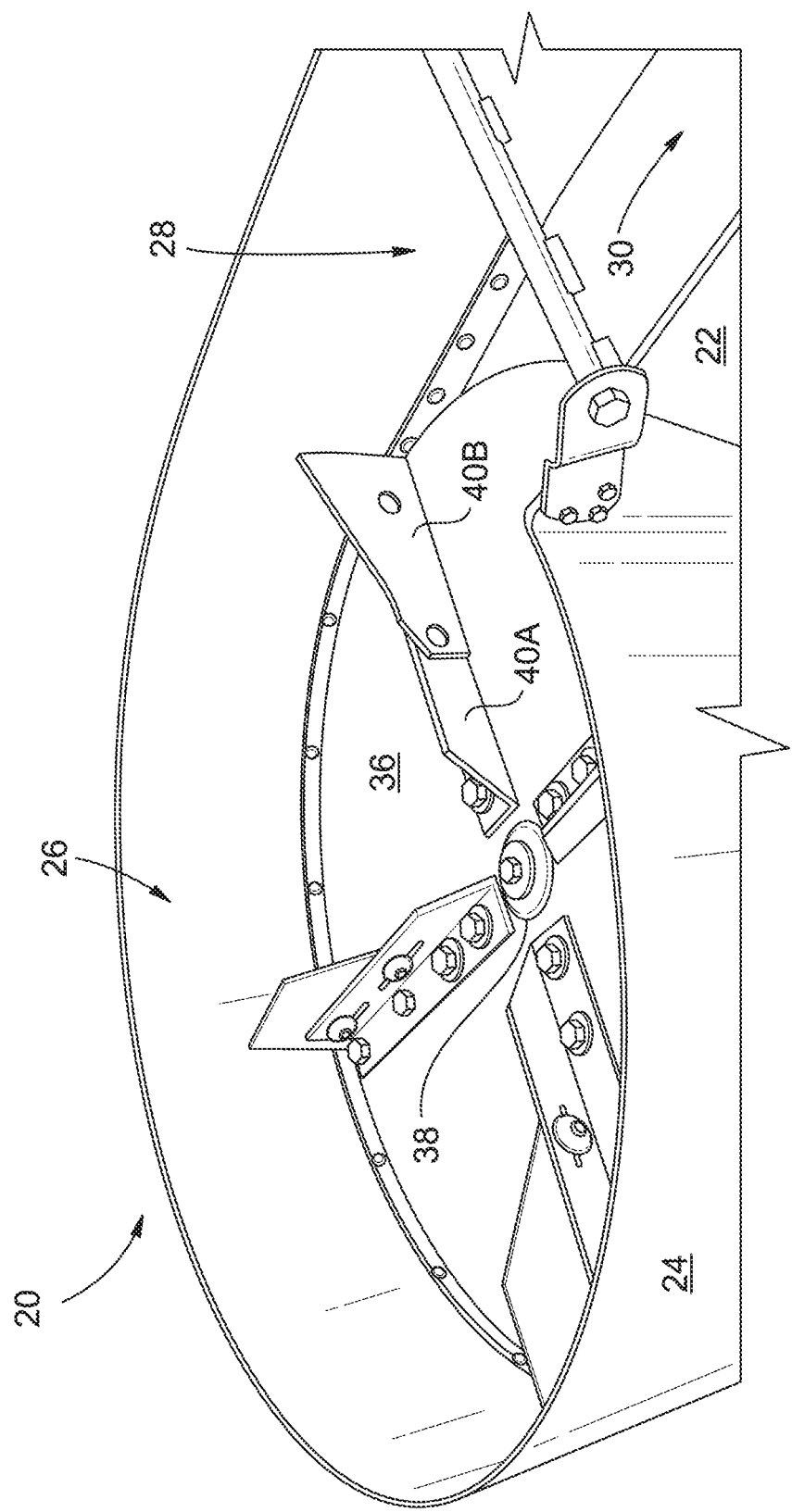
FIG. 4 is a schematic diagram showing, in overhead perspective view, an embodiment of an accelerator of an example MOG transfer system.
Figure 5:
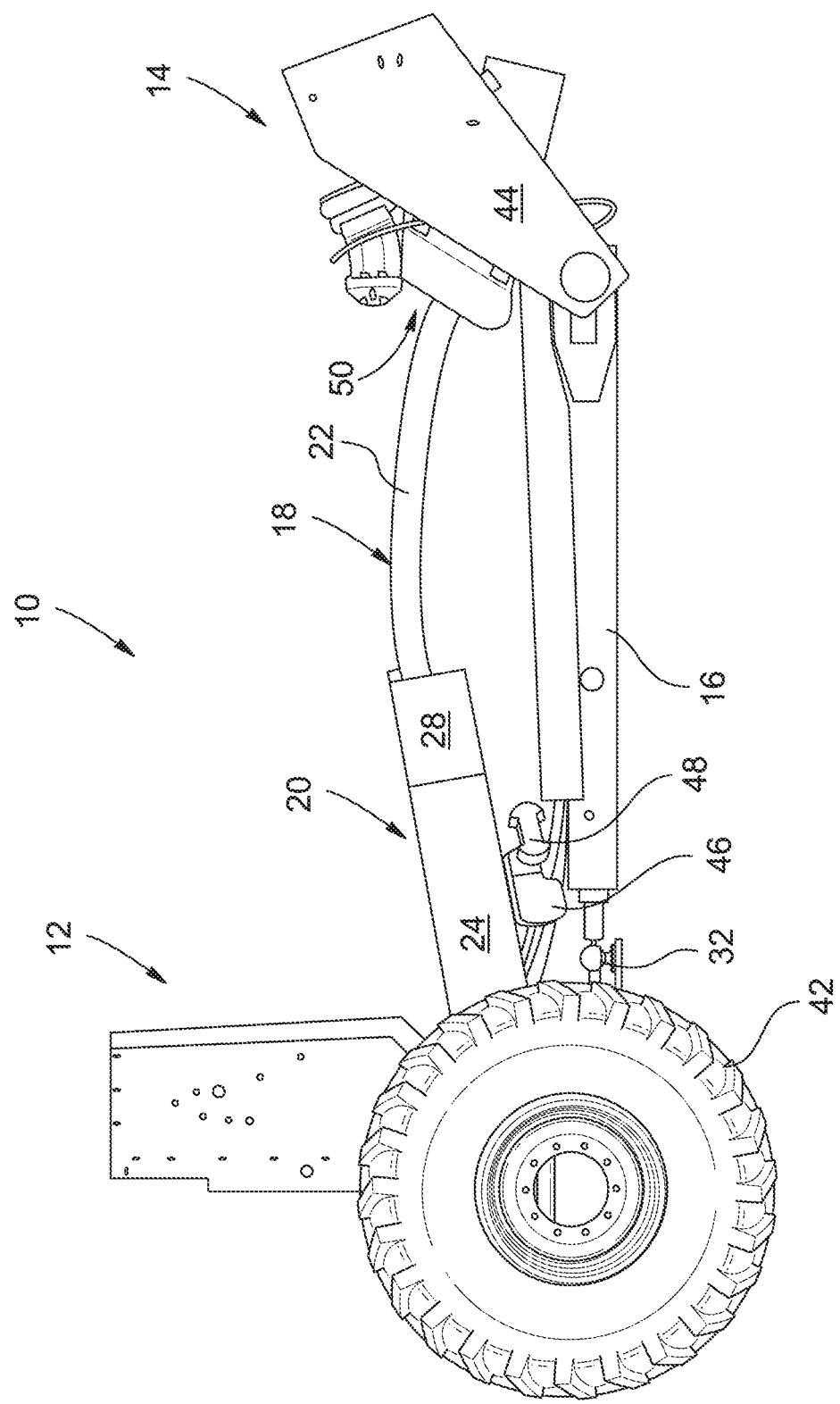
FIG. 5 is a schematic diagram showing, in fragmentary, side elevation view, an embodiment of a MOG transfer system.
Figure 6:
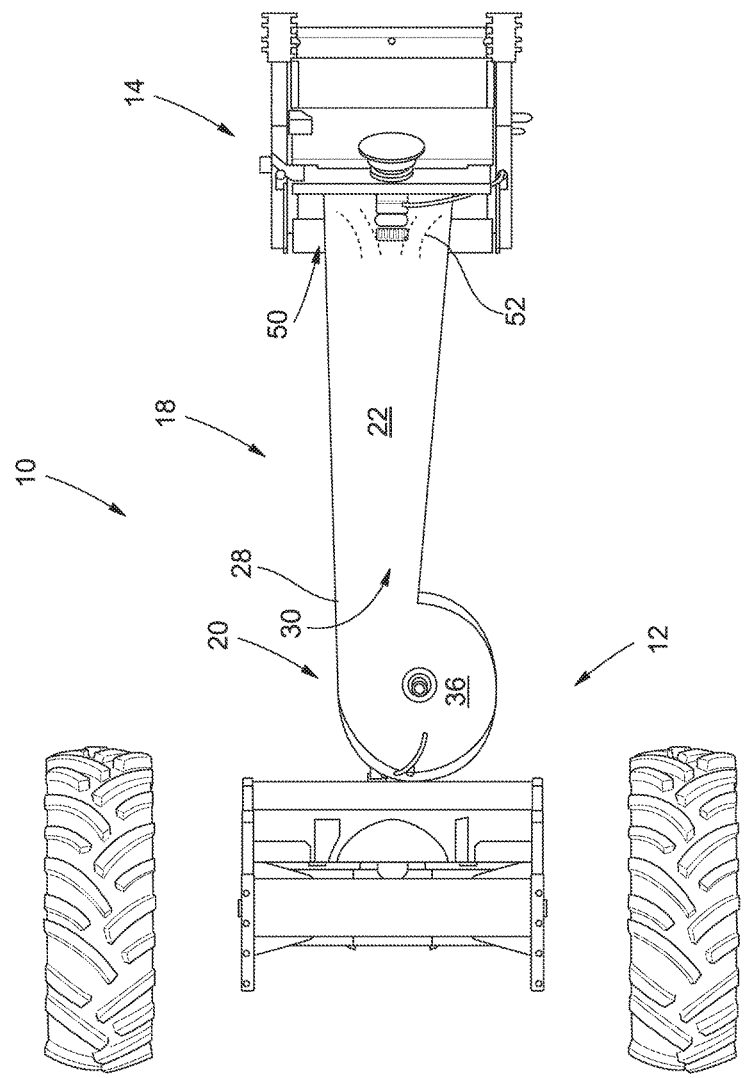
FIG. 6 is a schematic diagram showing, in fragmentary, overhead view, an embodiment of a MOG transfer system.

Referring to FIG. 4, shown is an embodiment of the accelerator 20 in overhead perspective view, and in particular, a portion of the inside of the housing 24 of the accelerator 20. It should be appreciated within the context of the present disclosure that the components of the accelerator 20 and/or their depicted configuration are merely illustrative of one example structure for the accelerator 20, and that in some embodiments, other components and/or configurations may be used to perform similar functionality. Within the housing 24 is a disk 36 that is rotated by a centrally-disposed shaft 38, the shaft 38 operatively coupled to (e.g., driven by) a gearbox/motor assembly (not shown) located, in one embodiment, proximal to (e.g., and beneath) the housing 24. The disk 36 comprises plural, substantially upright blades 40 mounted to the upper surface of the disk 36. Although shown with four (4) upright blades 40, fewer or more blades that are upright and/or angled relative to a plane of the disk 36 may be used in some embodiments. The blades 40 depicted in FIG. 4 are bolted to the upper surface of the disk 36, and of two piece construction (e.g., blade portions 40A and 40B, the latter mounted at least to the upright portion of blade 40A). In some embodiments, the blades 40 may be secured to the upper surface of the disk 36 according to other known mechanisms (e.g., welded), and/or each blade 40 (e.g., 40A and 40B) may be fabricated or cast as a single piece construction in some embodiments. Other blade configurations than those shown in FIG. 4 may be used in some embodiments to impart an accelerating force to the MOG. In the embodiment depicted in FIG. 4, the disk 36 rotates in clockwise fashion (when viewed from the top), causing the MOG that is discharged onto the disk 36 (through the top-side inlet 26) to be propelled by the blades 40 through the side outlet 28 and into the inlet end 30 of the conduit 22. The plane of the top surface of the disk 24 is parallel, or substantially parallel, to the top side of at least a first portion (e.g., from the inlet end 30 to approximately the apex point)

of the conduit 22. Such a structure, in cooperation with the gradual bow shape of the conduit 22, enables a discharge into, and subsequent flow of the MOG through, the conduit 22, which prevents or mitigates velocity loss and/or ricocheting effects of the MOG. Although the side outlet 28 is shown located on the right hand side of the housing 24, in some embodiments, the side outlet 28 may be located on the left hand side of the housing 24, with the resulting disk rotation being counter-clockwise in operation in the latter embodiment. Also noteworthy is that the use of the blades 40 as a propelling force for the MOG stream serves as opposed to pressurized air flow as the motivating force, contrary to conventional systems that rely entirely on the pressurized air flow from a blower or fan to transport crop material through a duct. Air flow in certain embodiments of a MOG transfer system 10 is controlled to enable the air flow speed to equal or substantially equal the MOG travel speed (e.g., the stream of air travels at the same velocity as the MOG so as to not convey the MOG nor slow the MOG down), yet conveyance of the MOG is primarily via the kinetic energy transferred from the rotating disk 36 and blade impact to the MOG stream. It should be understood by one having ordinary skill in the art, in the context of the present disclosure, that the disk 36 is one example rotating, motor-driven structure for accelerating the MOG, though some embodiments may use another structure, such as a cylindrical rotor, a reel-type structure, among other rotating structures that are driven to accelerate the MOG.

Attention is directed to the fragmentary schematic diagrams of FIGS. 5-6, which illustrate different views of an embodiment of a MOG transfer system 10. Referring to FIG. 5, only select portions of the combine harvester 12 are shown for brevity, such as the wheel 42 and portions of the frame. Further, only select portions of the baler 14 are shown for brevity, such as a portion of the frame 44, among other components described below. The accelerator 20, and in particular, the housing 24, is shown at a pitched angle that is substantially parallel to at least a first portion of the conduit 22 of the transfer assembly 18. The coupling between the conduit 22 and the housing 24 occurs at the juncture of the side outlet 28 of the housing 24 and the inlet end 30 of the conduit 22, as explained previously. Evident in this side elevation view of FIG. 5 is the substantially bowed structural configuration of at least the top side of the conduit 22. The transfer assembly 18 comprising the accelerator 20 and the conduit 22 is disposed above the baler hitch 16. The baler hitch 16 is pivotably joined to the harvesting machine hitch 34 (FIG. 3) of the combine harvester 12 at the ball joint 32. The opposing end of the baler hitch 16 is secured to the frame 44 of the baler 14. Also shown in FIG. 5 is a gearbox 46 and a motor 48 coupled to the gearbox 46. The gearbox 46 and motor 48 are collectively used to drive the disk 36 (FIG. 4) of the accelerator 20 via driving the rotation of the shaft 38 (FIG. 4). In one embodiment, the gearbox 46 and motor 48 achieve a variable-speed (e.g., continuous or stepped) drive for the disk 36, though some embodiments may use a fixed drive. For instance, the disk 36 may be variably driven based on one or a combination of factors, such as the difference in crops to be harvested and packaged, difference in conditions (e.g., environmental and/or operating conditions) within a given crop or among different crops, among other factors. In one embodiment, an operator of the combine harvester 12 may adjust the speed of the disk 36 based on visual feedback of conditions and/or MOG discharge and/or transfer performance (e.g., via screen display or observance from the cab of the combine harvester), sensed feedback of the same, or a combination of both (e.g., visual and sensed). In some embodiments, adjustments may be made automatically based on sensed performance and/or conditions. The gearbox 46 in the depicted example comprises a right-angle gearbox 46 that is powered by a hydraulic motor 48. The gearbox 46 is disposed beneath and proximal to the housing 24 in one embodiment, providing a savings in space compared to a coaxial-type gearbox and motor assembly. In some embodiments, other motive forces may be used, such as pneumatic, electric, magnetic, etc. for the motor 48. In some embodiments, a coaxial gearbox/motor assembly may be employed to drive the disk 36 of the to accelerator 20. At the other end of the transfer assembly 18, the conduit 22 terminates proximally to an inlet opening 50 of the baler 14.

Referring to FIG. 6, similar components of the MOG transfer system 10 shown in FIG. 5 are illustrated, including from the combine harvester 12 to the baler 14, the accelerator 20 coupled at the side outlet 28 to the conduit 22, which in turn terminates at the inlet opening 50 of the baler 14. Focusing attention initially at the accelerator 20, MOG from the shoe and thresher rotor of the combine harvester 12 discharge the MOG to the disk 36. In one embodiment, the accelerator 20, when the combine harvester 12 and the towed baler 14 are travelling in a substantially forward direction, with some (e.g., two to three (2-3) degrees from axis of forward direction) tolerance contemplated, is positioned to receive the discharged MOG in a range from approximately the 7:00 o'clock to 9:00 o'clock position of the disk 36 when viewed in FIG. 6 and using a clock analogy, enabling enough dwell time on the disk 36 to be sufficiently accelerated by the spinning of the disk 36 and propelling by the blades (not shown) of the disk 36 to be discharged tangentially from the accelerator 20. It should be appreciated by one having ordinary skill in the art, in the context of the present disclosure, that approximately ninety-eight percent (98%) of the time the combine harvester 12 is processing crop material when operating within approximately two-to-three (2-3) degrees within the forward direction. In some embodiments, other areas of the disk 36 may be used as the desired receiving location for MOG discharged from the thresher rotor or shoe, depending on the given design and/or operating conditions. In some embodiments, the housing 24 may be adjustably positioned relative to the discharge location of the shoe and thresher rotor, based on one or more factors including thresher rotor speed, discharge profile (e.g., where relative to the discharge end of the thresher rotor the MOG is predominantly discharged), crop type, moisture content, among other factors. In some embodiments, feedback may be employed to an operator (e.g., in the cab of the combine harvester 12, or to a remote location for remote control) and/or to a machine (e.g., in the case of autonomous farming implementations) to provide an indication of where on the disk 36 the MOG is discharged. In some embodiments, one or more sensors (e.g., image capture devices, density detection sensors, etc.) may be to positioned proximal to the accelerator 20 to enable sensing and subsequent feedback (e.g., via signaling, whether wireless or over a wired medium) of the location of the discharge location of the MOG onto the disk 36, prompting possible adjustments (e.g., automated or manual) to the positioning of the accelerator 20 relative to the discharge end of the thresher rotor and/or the shoe to ensure efficient operations.

Note that in some embodiments, the transfer assembly 18 may be modified to enable the MOG from the shoe to be diverted from the accelerator 20, and/or to enable the shoe MOG stream to be diverted from the thresher rotor MOG stream.

Turning attention now to the conduit 22, in one embodiment, the conduit 22 comprises a tapered overhead profile, having a narrower width proximal to the inlet end 30 of the conduit 22 and gradually widening up to a maximum width proximal to the inlet opening 50 of the baler 14. In some embodiments, other conduit structural configurations may be used. In one embodiment, the conduit 22 may be equipped with one or more deflectors, such as deflector 52 (shown in phantom), beginning and ending in an area adjacent the inlet opening 50 of the baler 14. For instance, because of the condensed stream enabled by the propelling force of the accelerator components and the gradual, continuous change in direction of the MOG stream (as enabled by the bowed structure of the conduit 22), the MOG stream is significantly narrower than the width of the inlet opening 50 of the baler 14. In some applications, mechanisms may be used to spread the MOG stream when the stream is in close proximity to the inlet opening 50. In one embodiment, the deflectors 52 may be located within an area corresponding to the last twelve (12) inches from the end of the conduit 22 adjacent the inlet opening 50. Other locations for and/or lengths of the deflectors 52 may be used in some embodiments. The deflectors 52 may be secured to interior surface of the top surface of the conduit 22. In one embodiment, the deflectors 52 may be fixed, and in some embodiments, the deflectors 52 may be adjustable (e.g., from the cab of the combine harvester 12, remotely, automatically based on feedback, or manually at the location of the deflectors 52). In some embodiments, the deflectors 52 may be secured to the baler 14 (e.g., to a frame of the baler 14 proximal to the inlet opening 50), wherein the deflectors extend partially into the conduit 22. In some embodiments, the deflectors 52 may be omitted. In some embodiments, the conduit 22 may be controlled to swing back and forth (laterally, such as from left to right), enabling the MOG stream to be spread out in the baler 14. The swing ability may be achieved in lieu of the deflectors 52 in some embodiments, or in combination with the deflectors 52 in some embodiments. Control of the swing movement or deflectors 52 may be achieved via an operator or machine control (e.g., based on discharge quantity or density or other conditions sensed at the inlet opening 50 of the baler 14 and communicated back to a controller of the deflectors 52). It should be appreciated within the context of the present disclosure that the quantity of deflectors 52 and associated shapes, or generally, configurations, may vary from those depicted in FIG. 6 in some embodiments.

Figure 7:
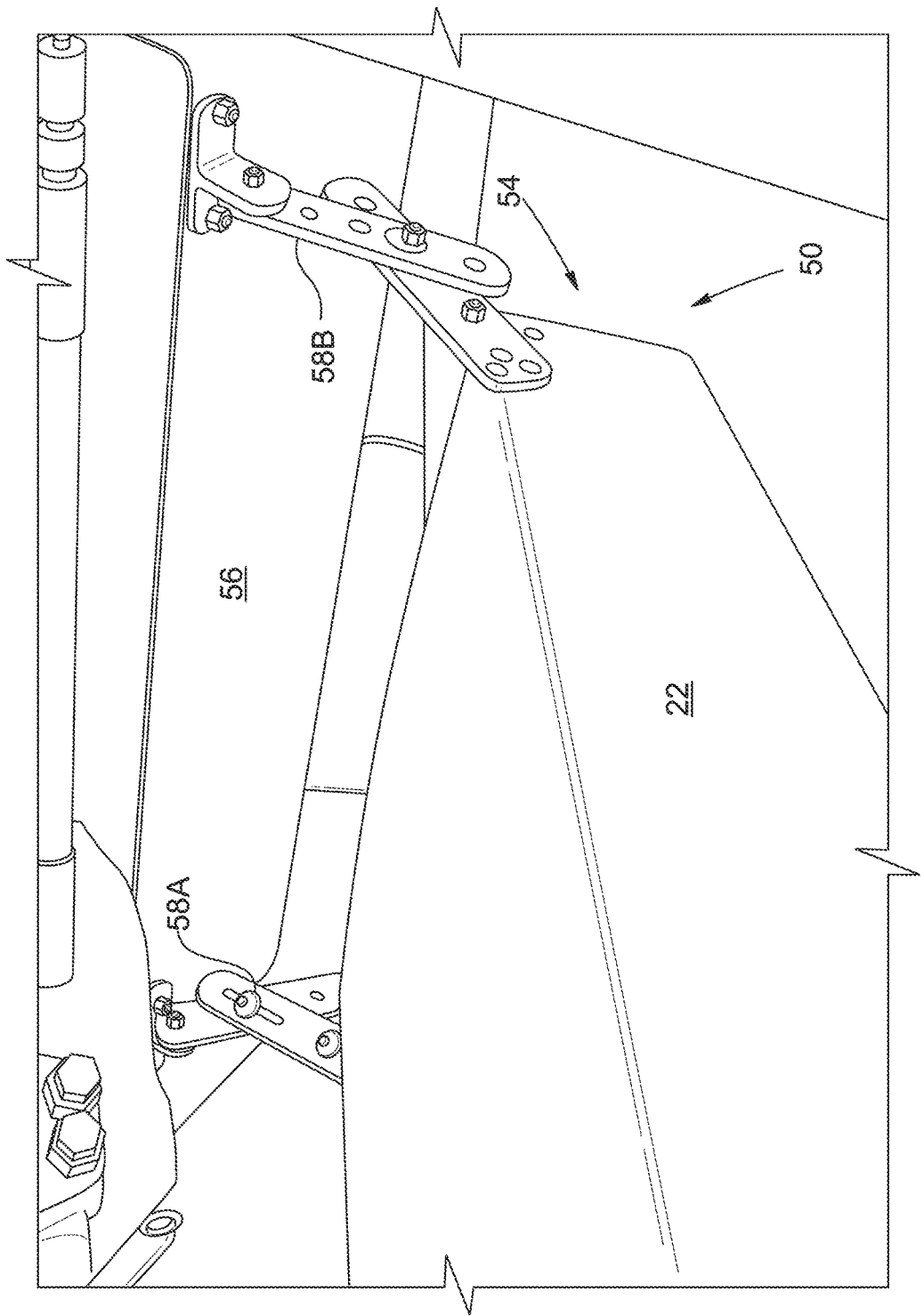
FIG. 7 is a schematic diagram showing, in perspective view, an example interface between an inlet opening of a baler and an outlet end of an embodiment of a conduit of an example MOG transfer system.

In FIG. 7, shown is a close-up, perspective view of a conduit outlet end 54 adjacent the inlet opening 50 of the baler 14 (FIG. 1). In one embodiment, the conduit 22 is secured to a frame 56 of the baler 14 adjacent the inlet opening 50. In the depicted example, the conduit 22 is secured via hinged bracketing 58 (e.g., 58A proximal to one side of the inlet opening 50 and bracketing 58B proximal to an opposing side of the inlet opening 50) adjacent the outlet end 54 to a top portion of the frame 56 of the baler 14 (e.g., adjacent the inlet opening 50). In some embodiments, the conduit 22 may be secured to a rail or track attached to the top frame 56, enabling a guided or controlled transverse movement back and forth of the outlet end 54 to distribute the condensed stream. In some embodiments, the outlet end 54 may comprise an end portion of the conduit 22 that is in pivotal arrangement with the upstream portion of the conduit 22, enabling side-to-side movement within the area of the inlet opening 50 (e.g., in lieu of secured attachment to the frame 56 or tracks or rails of the frame or in addition to the secured attachment to a track or rail). In some embodiments, the positioning of the outlet end 54 relative to the inlet opening 50 may be adjustable in one or a plurality of orientations. It is noted that the area of the outlet end 54 is smaller than the area of the inlet opening 50. In some embodiments, the difference in areas (between the inlet opening 50 and the outlet end 54) may be different than the depiction in FIG. 7. The inlet opening 50 is proximal to the feeding elements of the baler 14.

Figure 8:
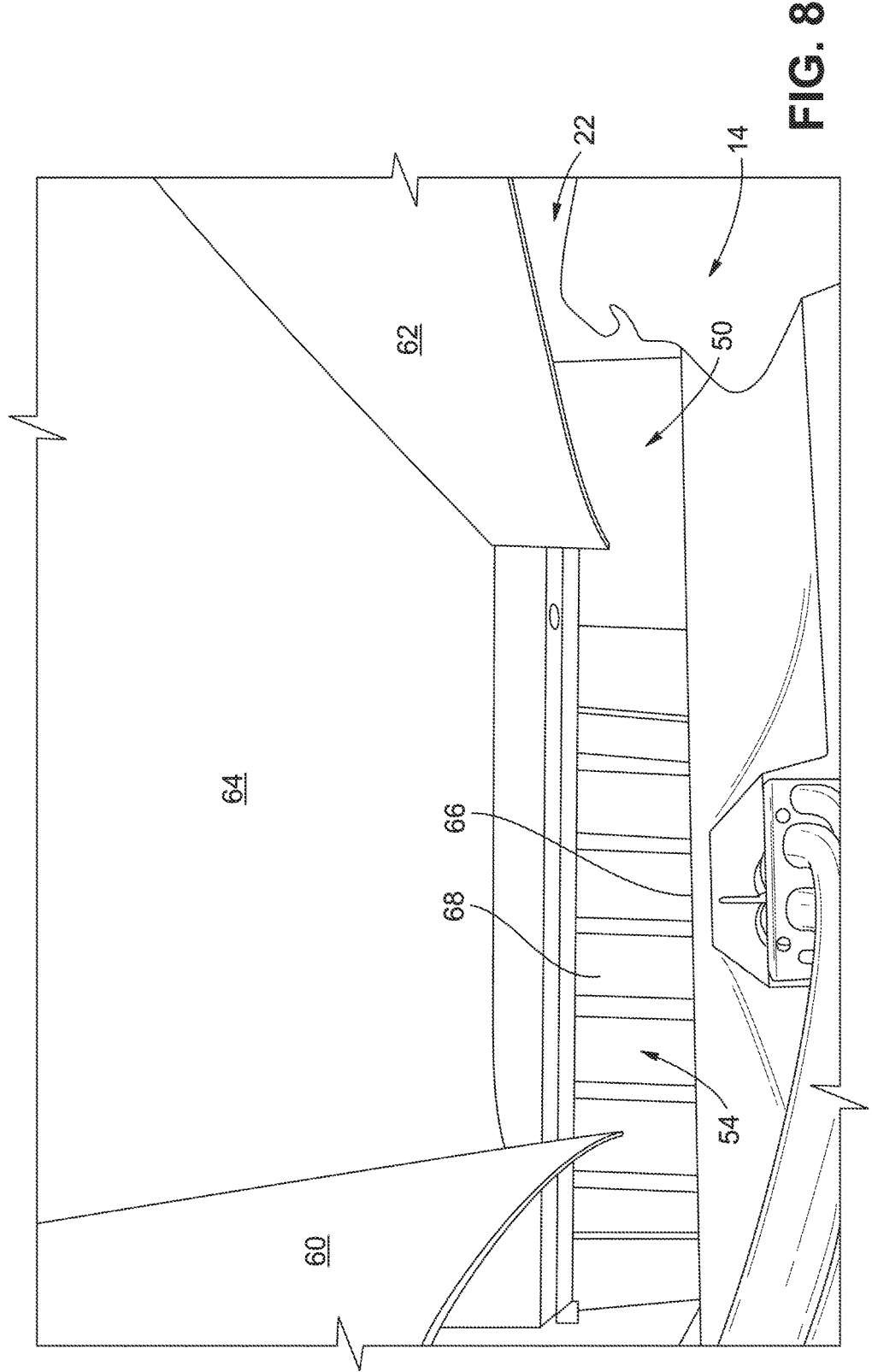
FIG. 8 is a schematic diagram showing, in bottom perspective view, an embodiment of a conduit of an example MOG transfer system proximal to an inlet opening of a baler.

FIG. 8 shows a bottom view of an embodiment of the conduit 22, looking into the baler 14, and in an area adjacent the inlet opening 50 of the baler 14. In particular, shown in FIG. 8 are the interior surfaces of two opposing sides 60 and 62 and one side 64 (top side) that is without an opposing side. In other words, the conduit 22, from the presently viewed perspective of FIG. 8, is configured as an inverted U shape (and open to the bottom to provide a fail safe mode in case of blockage at the baler 14, or other problems). In some embodiments, other configurations may be used. For instance, the sides 60 and 62 may be angled (e.g., angled outward, inward, etc.) relative to the top side 64 (rather than substantially orthogonal relative to the top side 64 as shown in FIG. 8). As another example, some embodiments of the conduit 22 may comprise a lip on one or both of the sides 60 and 62 that extend a defined distance toward the center of the conduit 22, yet still enable a fail safe mode (e.g., permitting crop material to fall to the ground during inoperable conditions, etc.). In some embodiments, though shown with solid surfaces, the sides 60 and 62 may be ribbed or otherwise have discontiguous side surfaces. In one embodiment, the depicted configuration of the conduit 22, or alternate configurations described above for some embodiments, is extended throughout the entire length of the conduit 22 (e.g., in addition to the section depicted in FIG. 8, also upstream portions of the conduit 22). In some embodiments, the upstream portions of the conduit 22 may be configured differently, such as having a bottom side up to a certain length of the conduit 22 (e.g., up to the apex, as one example). As is evident from FIGS. 7-8, the area of the outlet end 54 of the conduit 22 is significantly less than the area of the inlet opening 50, though some embodiments may have an outlet end 54 with a larger area relative to the area shown in FIG. 8. Also, is it noted that the conduit 22 is disposed above an inlet opening bottom surface 66, and extends into the inlet opening 50. For instance, the trajectory of the MOG stream, in one embodiment, impacts a target location corresponding to the packer components 68 of the baler 14 well beyond the edge of the outlet end 54 that extends into the inlet opening 50. In some embodiments, the conduit 22 may be adjusted in orientation (e.g., pitch, yaw, roll, etc.) to impact the baler 14 elsewhere.

Figure 9:
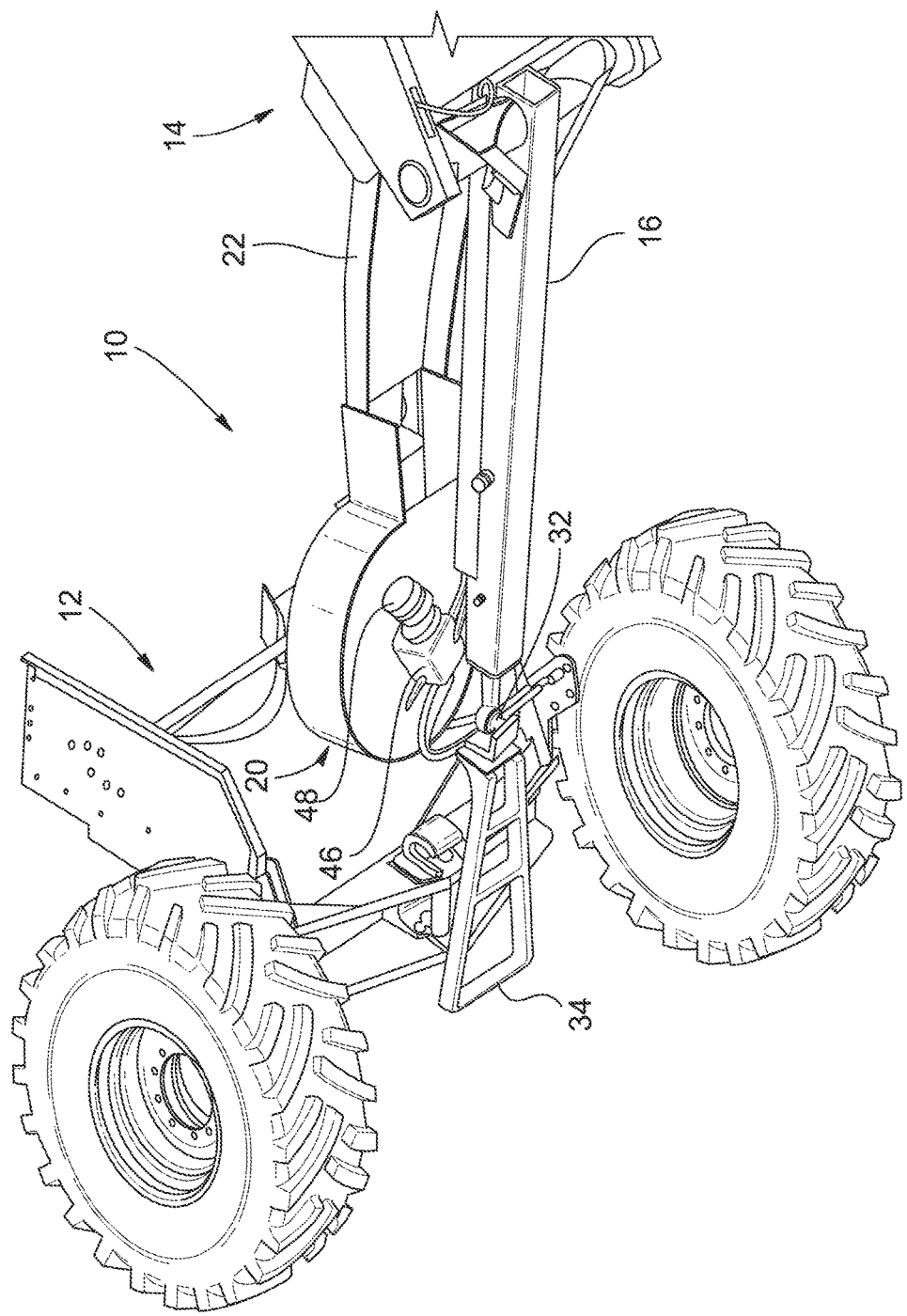
FIG. 9 is a schematic diagram showing, in fragmentary, bottom perspective view, an example omnidirectional articulating joint of an embodiment of a MOG transfer system.

Referring now to FIG. 9, shown in bottom, fragmentary view are certain portions of the MOG transfer system 10. In particular, emphasis is placed on the area of the ball joint 32. As shown, the baler hitch 16 of the baler 14 (or provided as a separate unit in some embodiments) is coupled to the harvesting machine hitch 34 of the combine harvester 12, enabling a pivotal connection between the baler hitch 16 (and subsequently the attached accelerator 20, conduit 22, and baler 14) and the combine harvester 12. Also shown is the gearbox 46 and motor 48 disposed beneath the accelerator 20, though some embodiments may position the gearbox 46 and motor 48 or other motive assembly for the disk 36 (FIG. 4) elsewhere.

Figure 10:
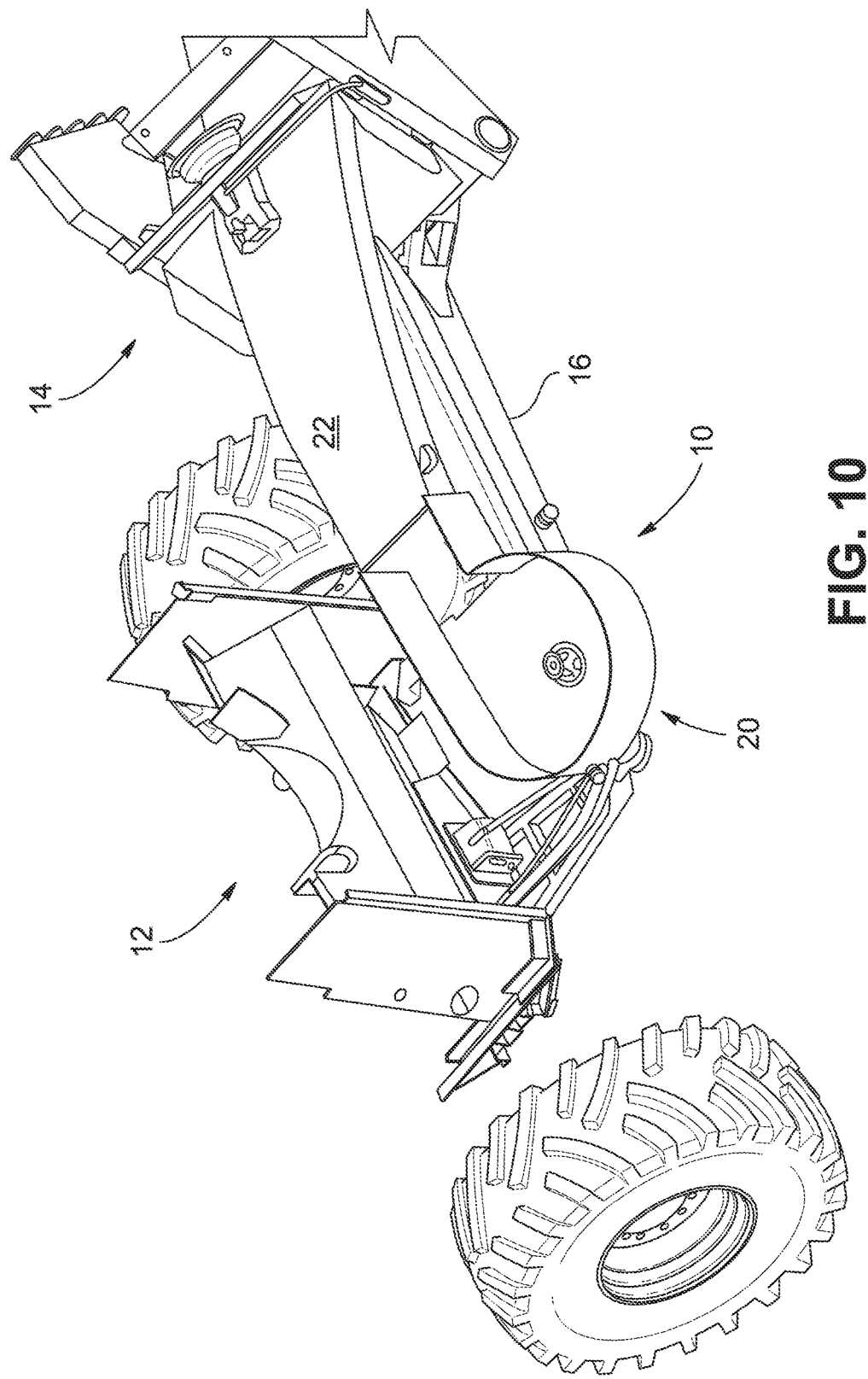
FIG. 10 is a schematic diagram showing, in fragmentary, overhead perspective view, an embodiment of a MOG transfer system in right-side articulation.

FIG. 10 shows the MOG transfer system 10, and in particular, an example articulation where the baler 14 is positioned to the right relative to the combine harvester 12. The fact that the accelerator 20 is situated beneath the combine harvester 12 (e.g., beneath an upper frame of the combine harvester 12) and proximal to the ball joint 32 (FIG. 9), combined with the narrow profile of the conduit 22 and the use of an omnidirectional articulating joint (the ball joint 32) enables a very maneuverable combine harvester 12 and baler 14 combination. For instance, in one embodiment, the turn angle depicted in FIG. 10 is approximately seventy to seventy-five (70-75) degrees (e.g., the orientation of the baler 14 relative to the combine harvester 12), with a total range of operational articulation (left and right) of one hundred-forty to one hundred-fifty (140-150) degrees. In some embodiments, a greater or lower maximum turn angle may be achieved. Also, the conduit 22 is secured to the baler 14, resulting in an alignment of the conduit 22 and baler 14 that remains constant despite the turn angle at play. One benefit of such a structural arrangement is that the trajectory of the MOG stream (and the target of impact at the baler 14) from the accelerator 20 to the baler 14 via the conduit 22 is unaltered (or in some embodiments, if altered, to an insignificant degree) despite the change in turn angle. In addition, in view of the use of the ball joint 32 and proximity of the accelerator 20 to the ball joint 32, as well as the fact that the accelerator 20 is secured to the baler hitch 16 and the conduit 22 is secured to the baler 14, changes in pitch, yaw, and/or roll likewise do not alter the trajectory or target (or in some embodiments, do not alter the trajectory or target to any significant degree) of to the MOG stream from the accelerator 20 to the baler 14.

Figure 11:
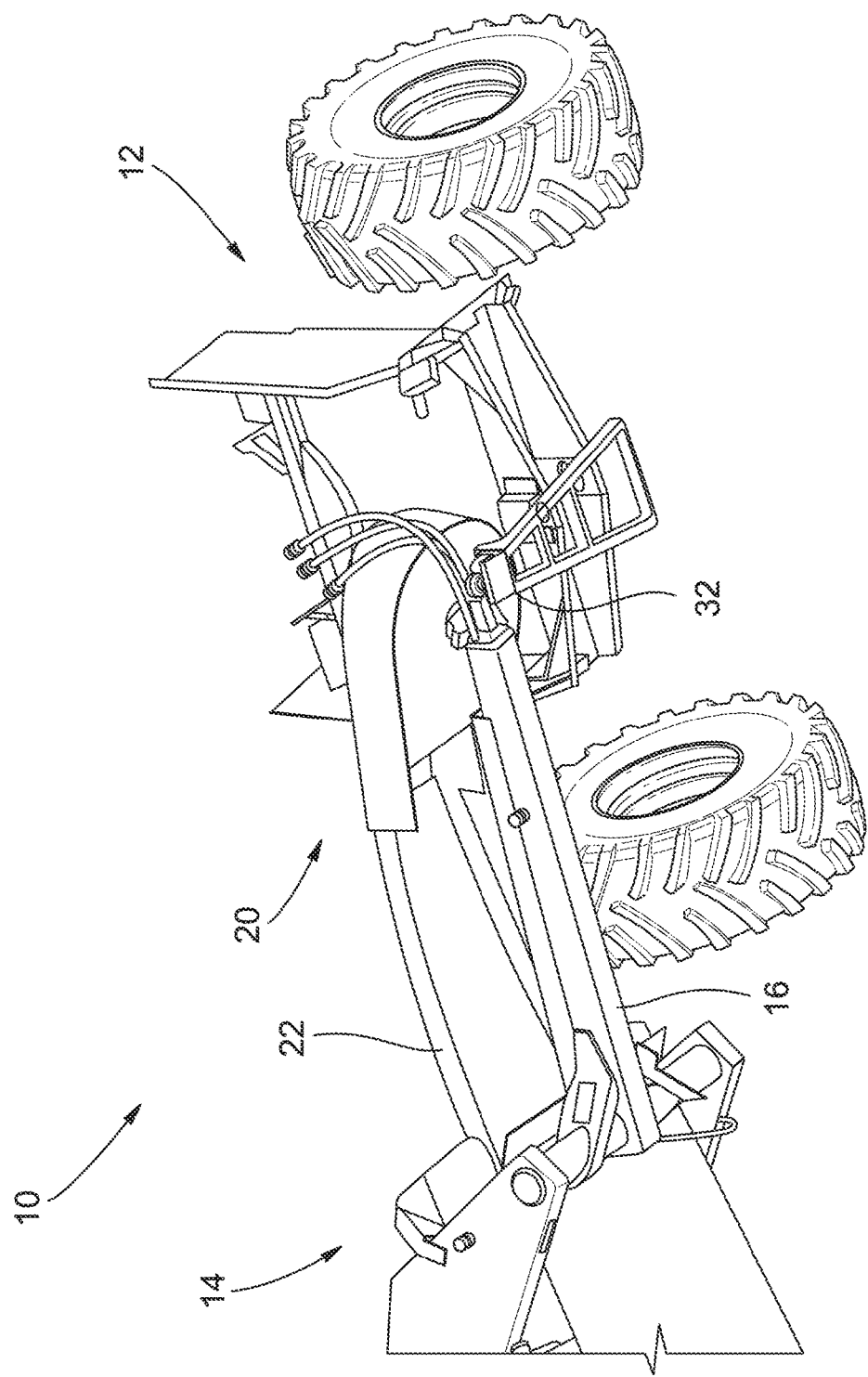
FIG. 11 is a schematic diagram showing, in fragmentary, bottom perspective view, an embodiment of a MOG transfer system in left-side articulation.

FIG. 11 shows another bottom view of the MOG transfer system 10, with the baler 14 oriented to the left of the combine harvester 12 (with a similar turn angle to that depicted in FIG. 10). Similar to the illustration in FIG. 10, the combine harvester 12 is pivotably coupled to the baler 14 at the ball joint 32. The accelerator 20 is shown mounted to the baler hitch 16, and the conduit 22 is secured to the baler 14 and the accelerator 20, whereby changes in articulation (e.g., including changes in pitch, yaw, roll) have no or insignificant affect on the trajectory/target of the MOG stream that is transferred from the accelerator 20 to the baler 14 via the conduit 22.

It should be appreciated within the context of the present disclosure that certain embodiments of the MOG transfer system 10 confine the MOG stream to a thin, consolidated layer by continuously changing the direction of the MOG stream via the curvature of the conduit 22, prohibiting or significantly mitigating any loss in velocity and hence any loss in crop material.

Figure 12:
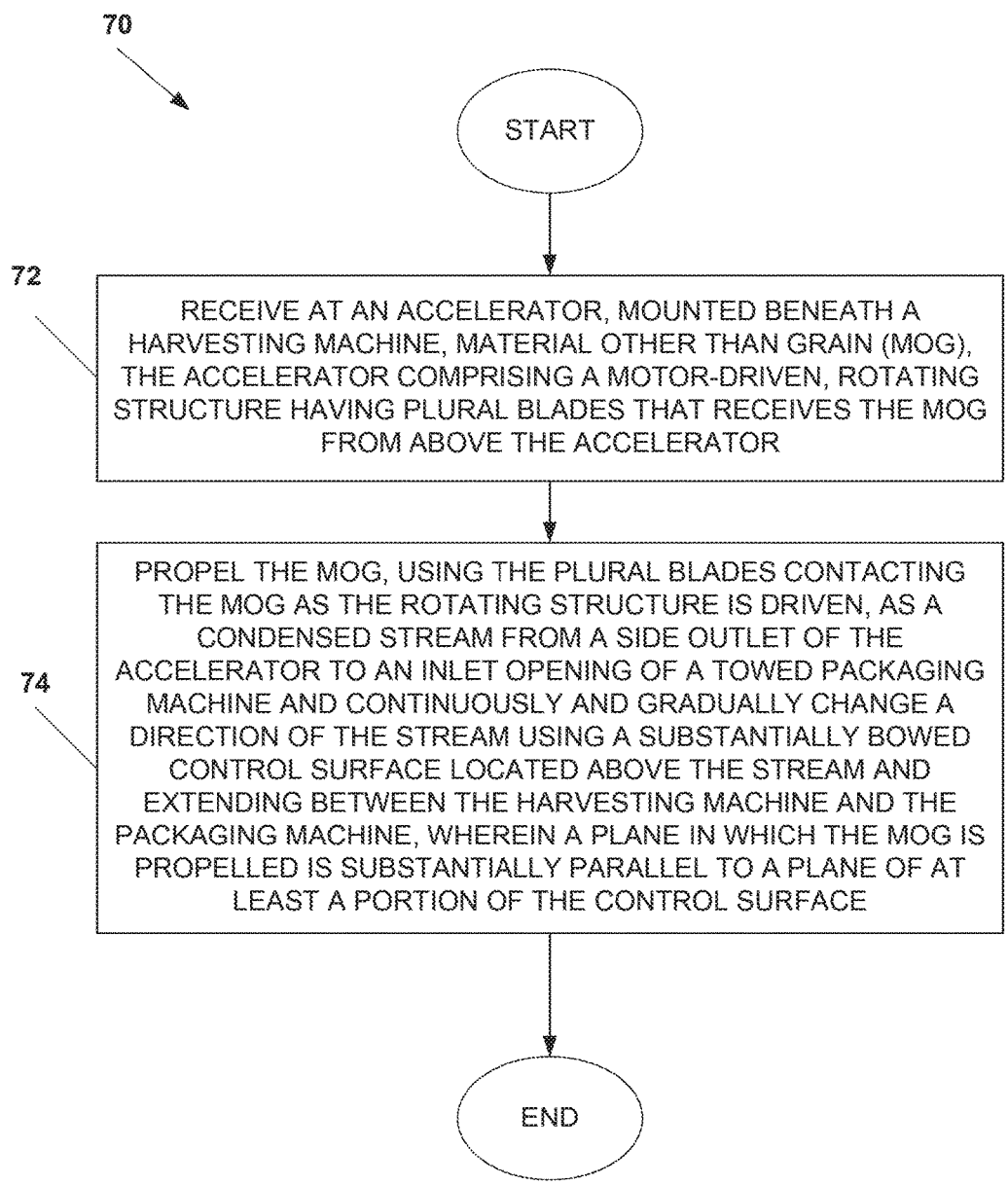
FIG. 12 is a flow diagram that illustrates an embodiment of a MOG transfer method.

Having described some example embodiments of a MOG transfer system 10, it should be appreciated in view of the present disclosure that one embodiment of a MOG transfer method, depicted in FIG. 12 and denoted as method 70, comprises receiving at an accelerator, mounted beneath a harvesting machine, material other than grain (MOG), the accelerator comprising a motor-driven, rotating structure having plural blades that receives the MOG from above the accelerator (72); and propelling the MOG, using the plural blades contacting the MOG as the rotating structure is driven, as a condensed stream from a side outlet of the accelerator to an inlet opening of a towed packaging machine and continuously and gradually changing a direction of the stream using a substantially bowed control surface located above the stream and extending between the harvesting machine and the packaging machine, wherein a plane in which the MOG is propelled is substantially parallel to a plane of at least a portion of the control surface (74).

Any process descriptions or blocks in flow charts should be understood as representing steps in a process, and alternate implementations are included within the scope of the embodiments in which functions additional steps may be performed.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A transfer system conveying material other than grain (MOG) from a harvesting machine to a packaging machine towed by the harvesting machine, the system comprising:
   a harvesting machine comprising a harvesting machine hitch;
   a packaging machine comprising a packaging machine hitch;
   an omnidirectional articulating joint pivotably joining the harvesting machine hitch to the packaging machine hitch such that the harvesting machine is secured to the packaging machine in a towing relationship;
   an accelerator, the accelerator comprising a housing mounted to the packaging machine hitch, the housing comprising a top-side inlet and a side outlet, the accelerator also comprising a MOG-propelling disk disposed in the housing and rotatable about an axis; and
   a conduit disposed adjacent to and above the packaging machine hitch, the conduit comprising an inlet end and an outlet end, the inlet end coupled to, and adjacent to, the side outlet, the conduit comprising first and second opposing side portions and a top side portion without an opposing bottom portion, wherein at least part of the top side portion is parallel with the plane of the disk, wherein the accelerator is secured to the conduit and the packaging machine hitch, and the conduit is secured to the packaging machine, and wherein the accelerator, conduit, and packaging machine are collectively in pivotal arrangement relative to the harvesting machine.

2. The system of claim 1, wherein the packaging machine hitch and conduit comprise an articulating range of approximately one hundred fifty (150) degrees.

3. The system of claim 1, wherein the conduit is adjustable in pitch, yaw, or a combination of both.

4. The system of claim 1, wherein the top-side inlet comprises a lip adjacent a top edge of the top-side inlet, wherein the lip extends inward, downward, or a combination of inward and downward.

5. The system of claim 1, wherein the axis is angled relative to a vertical axis, and wherein a top side of the conduit is substantially parallel to a plane corresponding to a top surface of the disk along at least a first portion of the conduit.

6. The system of claim 1, wherein the conduit comprises plural deflectors coupled beneath the top side portion, the plural deflectors beginning and ending proximal to the outlet end.

7. The system of claim 1, further comprising a gearbox and motor assembly that is configured to drive the disk at a variable speed.

8. The system of claim 1, wherein the conduit has a substantially bowed configuration from the inlet end to the outlet end.

9. The system of claim 1, wherein the packaging machine comprises an inlet opening having a first area, the outlet end of the conduit secured to a frame of the packaging machine adjacent the inlet opening, the outlet end comprising a second area smaller than the first area.

10. A method, comprising:
receiving material other than grain (MOG) at an accelerator mounted to a harvesting machine, the accelerator comprising a motor-driven, rotating structure having plural blades that receives the MOG from above the accelerator; and
propelling the MOG, using the plural blades contacting the MOG as the rotating structure is driven, as a condensed stream from a side outlet of the accelerator to an inlet opening of a towed packaging machine and continuously and gradually changing a direction of the stream using a substantially bowed control surface located above the stream and extending between the harvesting machine and the packaging machine, wherein a plane in which the MOG is propelled is substantially parallel to a plane of at least a portion of the control surface.

11. The method of claim 10, further comprising maintaining a same trajectory of the stream and same delivery point to the packaging machine regardless of orientation between the harvesting machine and the packaging machine while still operational.

* * * * *